(12) United States Patent
Lee

(10) Patent No.: US 9,187,125 B2
(45) Date of Patent: Nov. 17, 2015

(54) PARKING ASSISTANCE SYSTEM AND METHOD FOR VEHICLE

(71) Applicant: Hyundai Mobis Co., Ltd., Seoul (KR)

(72) Inventor: Seong Soo Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 10 days.

(21) Appl. No.: 14/269,344

(22) Filed: May 5, 2014

(65) Prior Publication Data

US 2015/0142267 A1    May 21, 2015

(30) Foreign Application Priority Data

Nov. 21, 2013 (KR) ........................ 10-2013-0141998

(51) Int. Cl.
  *B62D 11/00* (2006.01)
  *B62D 15/02* (2006.01)
  *G01C 21/20* (2006.01)
  *G08G 1/14* (2006.01)

(52) U.S. Cl.
  CPC ............ *B62D 15/027* (2013.01); *B62D 15/028* (2013.01); *B62D 15/0285* (2013.01); *G01C 21/20* (2013.01); *G08G 1/14* (2013.01)

(58) Field of Classification Search
  None
  See application file for complete search history.

(56) References Cited

U.S. PATENT DOCUMENTS 6,611,744 B1 * 8/2003 Shimazaki et al. .............. 701/41
6,999,002 B2 * 2/2006 Mizusawa et al. .......... 340/932.2
7,069,128 B2 * 6/2006 Iwama ............................ 701/36
8,248,220 B2 * 8/2012 Nagamine et al. ............. 340/435
2002/0005779 A1 * 1/2002 Ishii et al. ...................... 340/436
2006/0190147 A1 * 8/2006 Lee et al. .......................... 701/26
2007/0057816 A1 * 3/2007 Sakakibara et al. ........ 340/932.2
2009/0143967 A1 * 6/2009 Lee et al. ........................ 701/119
2009/0278709 A1 * 11/2009 Endo et al. ................. 340/932.2
2009/0303080 A1 * 12/2009 Kadowaki et al. ......... 340/932.2
2010/0033348 A1 * 2/2010 Kawabata et al. .......... 340/932.2
2010/0049402 A1 * 2/2010 Tanaka ............................ 701/41
2010/0231417 A1 * 9/2010 Kadowaki et al. ......... 340/932.2
2010/0235053 A1 * 9/2010 Iwakiri et al. ................... 701/42

(Continued)

FOREIGN PATENT DOCUMENTS

KR  10-2012-0086576  8/2012
KR  10-2013-0021102  3/2013

(Continued)

OTHER PUBLICATIONS

Office Action issued on Nov. 17, 2014 in counterpart Korean Application No. 10-2013-0141998.

*Primary Examiner* — Calvin Cheung
(74) *Attorney, Agent, or Firm* — NSIP Law

(57) ABSTRACT

Disclosed is a parking assistance system and method for a vehicle. The system for assisting parking for a vehicle includes: an image composition unit configured to generate a composed image in a form of a top view or an around view; a parking line detection unit configured to detect a parking line through image-processing of the composed image; a distance and inclination calculation unit configured to calculate a distance and an inclination (slope) between the detected parking line and the vehicle; and a movement path generation unit configured to generate a movement path for deposing the vehicle at an initial position, the initial position being set to a position at which the detected parking line is parallel to a longitudinal center axis of the vehicle, and the detected parking line and the vehicle are spaced apart from each other by a predetermined interval.

15 Claims, 5 Drawing Sheets

(56) References Cited

U.S. PATENT DOCUMENTS

| | | | |
|---|---|---|---|
| 2010/0274446 A1* | 10/2010 | Sasajima et al. | 701/36 |
| 2011/0013019 A1* | 1/2011 | Yamanaka et al. | 348/148 |
| 2011/0181441 A1* | 7/2011 | Ma et al. | 340/932.2 |
| 2011/0276225 A1* | 11/2011 | Nefcy et al. | 701/41 |
| 2012/0169875 A1* | 7/2012 | Matsukawa et al. | 348/148 |
| 2013/0073119 A1* | 3/2013 | Huger et al. | 701/1 |
| 2014/0347195 A1* | 11/2014 | Stempnik et al. | 340/932.2 |

FOREIGN PATENT DOCUMENTS

| | | | | |
|---|---|---|---|---|
| KR | 10-2013-0112550 | | 10/2013 | |
| WO | WO2013/110116 A1 * | 8/2013 | | B60Q 1/48 |

* cited by examiner

PARKING ASSISTANCE SYSTEM AND METHOD FOR VEHICLE

CROSS-REFERENCE TO RELATED APPLICATION

This application claims priority to and the benefit of Korean Patent Application No. 10-2013-0141998 filed in the Korean Intellectual Property Office on Nov. 21, 2013, the entire contents of which are incorporated herein by reference.

TECHNICAL FIELD

The present invention relates to a parking assistance system and method for a vehicle, and more particularly, to a parking assistance system and method for a vehicle, which guide and assist a user operation of a steering wheel while parking a vehicle.

BACKGROUND OF THE INVENTION

A parking assistance system, which is a system for helping a driver to more easily and conveniently park a vehicle, recognizes a parking space through a sensor mounted in a vehicle, calculates an optimum path, through which the vehicle may be parked within the recognized parking space, and automatically controls a steering wheel or assists driver's operation of a steering wheel by an audio-visual method.

As one example of the parking assistance system, a parking assistance system based on an ultrasonic wave sensor appears, and the parking assistance system based on the ultrasonic wave sensor recognizes a surrounding obstacle and a parking space through the ultrasonic wave sensor and generates a movement path of a vehicle. However, in the case where an obstacle is not present, there is a disadvantage in that it is difficult for the parking assistance system based on the ultrasonic wave sensor to recognize a parking space, and the parking assistance system based on the ultrasonic wave sensor is influenced by an obstacle disposition state around the parking space (for example, in the case where a next vehicle is parked to be misaligned to a parking line), and thus a parking assistance system based on a camera image has been recently considered.

However, even though the parking assistance system is based on any one of the ultrasonic wave sensor, the camera, and the like, in order to have an effective detection range and recognize an accurate parking space, a vehicle needs to be disposed at an appropriate position in a parking space and the like. That is, when the system is operated at a position which is spaced apart too far from a parking line or a parking space, the system gets out of the effective detection range or has degraded detection accuracy, so that it is difficult to reliably recognize a parking space and guide the parking. The aforementioned problem causes inconvenience in that the system is not operated or recognition performance deteriorates even though a user, who is not accustomed to use the parking assistance system, approaches close to a parking line.

SUMMARY OF THE INVENTION

The present invention has been made in an effort to provide a parking assistance system and method for a vehicle, which may more reliably recognize a parking space and guide parking, and improve convenience of a user.

An exemplary embodiment of the present invention provides a parking assistance system for a vehicle, including: an image composition unit configured to generate a composed image in a form of a top view or an around view; a parking line detection unit configured to detect a parking line through image-processing of the composed image; a distance and inclination calculation unit configured to calculate a distance and an inclination (slope) between the detected parking line and the vehicle; and a movement path generation unit configured to generate a movement path for deposing the vehicle at an initial position, the initial position being set to a position at which the detected parking line is parallel to a longitudinal center axis of the vehicle, and the detected parking line and the vehicle are spaced apart from each other by a predetermined interval.

Another exemplary embodiment of the present invention provides a parking assist method for a vehicle, including: a composed image obtainment operation of generating a composed image in a form of a top view or an around view from an image photographed by a plurality of cameras; a parking line detection operation of detecting a parking line based on the composed image; a distance and inclination calculation operation of calculating a distance and an inclination (slope) between the detected parking line and the vehicle; a movement path generation operation of generating a movement path for disposing the vehicle at an initial position, the initial position being set considering an effective detection range or detection accuracy of an ultrasonic wave sensor or a camera mounted in the vehicle; and a movement assistance operation of controlling driving of a steering wheel of the vehicle according along the generated movement path, or guiding a user operation of the steering wheel through an audio-visual means.

According to the parking assistance system and method according to the exemplary embodiments of the present invention, the vehicle may be moved to and disposed at a predetermined initial position considering an effective detection range or detection accuracy of the ultrasonic wave sensor and the like. Accordingly, it is possible to more accurately and reliably recognize a parking space.

The parking assistance system and method according to the exemplary embodiments of the present invention may automatically control a movement of the vehicle or guide the movement of the vehicle to a user from an initial stage before recognizing the parking space, thereby enabling the user to more easily and conveniently receive parking assistance or guide.

DETAILED DESCRIPTION OF THE EMBODIMENTS

Hereinafter, exemplary embodiments of the present invention will be described with reference to the accompanying drawings. However, the exemplary embodiments below are provided to help understand the present invention, and the scope of the present invention is not limited to the exemplary embodiments below. Further, the exemplary embodiments below are provided to more fully describe the present invention to those skilled in the art, and detailed explanation of publicly known constitutions which may be determined to unnecessarily obscure the technical point of the present invention may be omitted.

Figure 1:
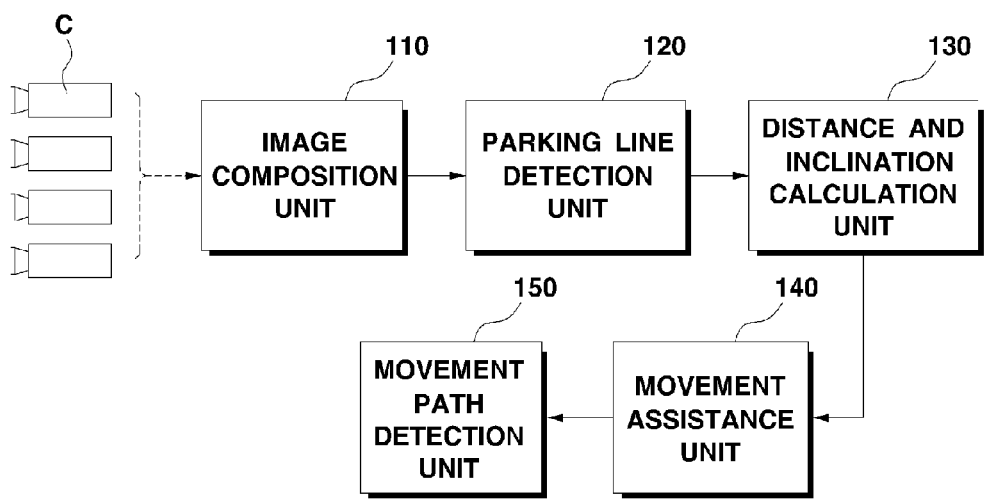
FIG. 1 is a configuration diagram of a parking assistance system for a vehicle according to an exemplary embodiment of the present invention.

FIG. 1 is a configuration diagram of a parking assistance system for a vehicle according to an exemplary embodiment of the present invention.

Referring to FIG. 1, a parking assistance system for a vehicle (hereinafter, referred to as a "parking assistance system 100") according to an exemplary embodiment of the present invention may include an image composition unit 110, a parking line detection unit 120, a distance and inclination calculation unit 130, a movement path generation unit 140, and a movement assistance unit 150.

In general, the parking assistance system 100 according to the present exemplary embodiment invention may dispose or guide a vehicle at or to an initial position, at which a parking space may be appropriately recognized, considering an effective detection range or detection accuracy of a camera, an ultrasonic wave sensor, and the like. That is, the parking assistance system 100 according to the present exemplary embodiment may move and assist a position or a posture of the vehicle from an initial stage, at which the recognition of the parking space begins, thereby more accurately recognizing the parking space and improving user convenience.

The image composition unit 110 may obtain an image signal from a camera C, and generate a composed image in a form of a top view or an around view through the obtained image signal. The composed image in the form of the top view or the around view may mean a plane image of front, rear, left, and right sides of the vehicle which are viewed from a predetermined position of an upper side of the vehicle. The generation of the composed image has been known in the name of an around view monitoring system in the business field in the art.

The parking line detection unit 120 may detect a parking line through the compose image generated by the image composition unit 110. That is, the parking line detection unit 120 detects an interested parking line from the composed image through an image processing process.

Figure 2:
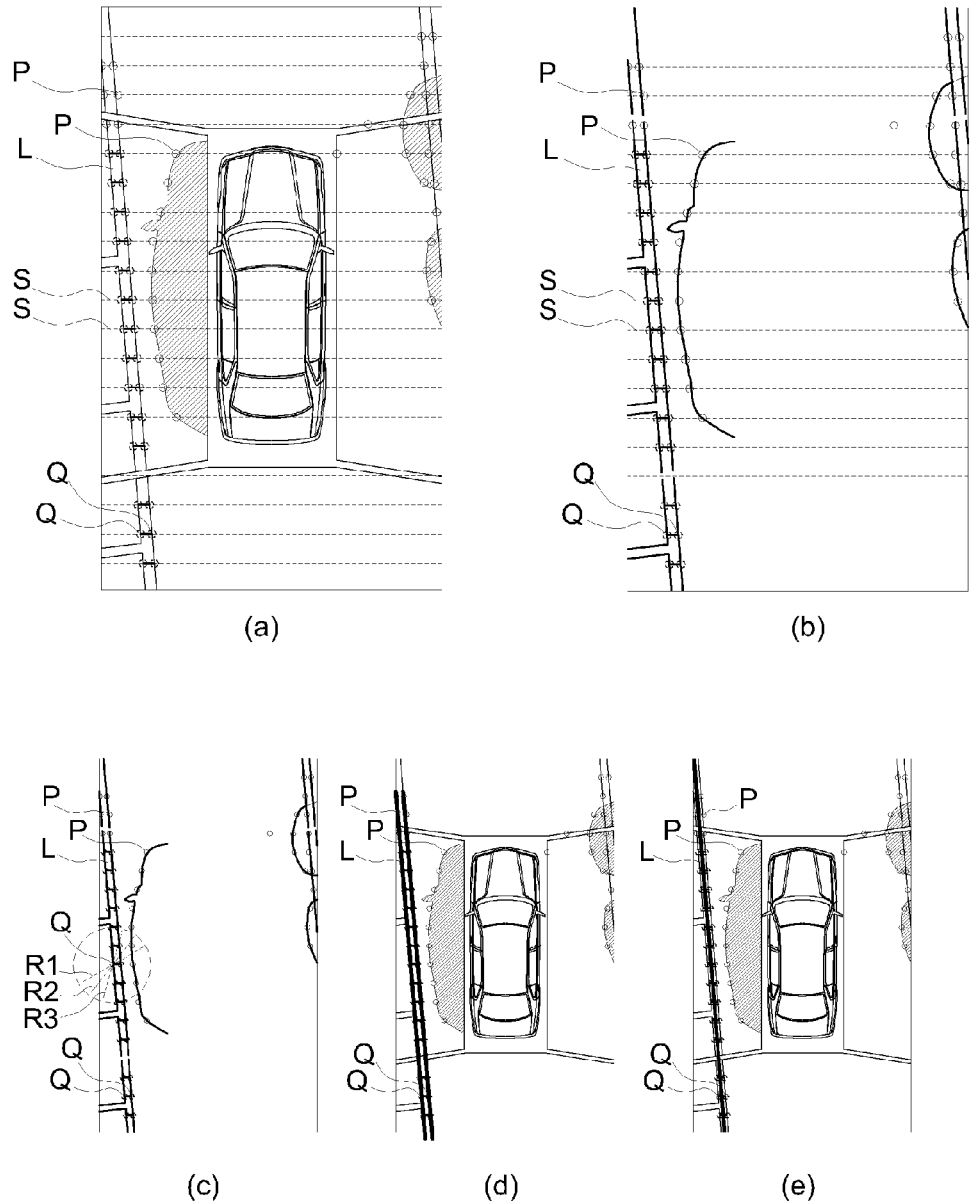
FIGS. 2A, 2B, 2C, 2D, and 2E are diagrams illustrating an example of a process of detecting a parking line by a parking line detection unit illustrated in FIG. 1.

FIG. 2 is a diagram illustrating an example of a process of detecting a parking line by the parking line detection unit illustrated in FIG. 1.

For reference, FIGS. 2B and 2C illustrate contour line images of the composed image, and light and shade regions are reversed and illustrated for convenience of description (that is, lines indicated with a black color in FIGS. 2B and 2C are lines indicated to be bright (white) in an actual contour line image, and a background indicated with a white color is a region indicated to be dark (black) in the actual contour line image).

First, referring to FIGS. 2A and 2B, the parking line detection unit 120 may extract a candidate point Q having a brightness pattern of a parking line L from the provided composed image.

Particularly, the parking line detection unit 120 may select a plurality of sections S for searching for characteristic points P in the composed image. Further, the parking line detection unit 120 may generate a contour line image (see FIG. 2B) from the composed image, and extract the plurality of characteristic points P from the generated contour line image by investigating the contour line image in a horizontal direction for each section S. Points having a relatively high light and shade gradient may be extracted as the respective characteristic points P through the horizontal directional investigation for each section S.

The parking line detection unit 120 may select some characteristic points P having the brightness pattern of the parking line L among the plurality of characteristic points P, and generate a combination of the candidate points Q of the parking line L. Since the parking line L is generally displayed by a bright color, such as a white color or a yellow color, some characteristic points P, which exhibit the brightness pattern in an order of dark, bright, and dark in the horizontal directional investigation for each section S, may be selected as the candidate points Q of the parking line L.

Referring to FIGS. 2C to 2E, the parking line detection unit 120 may select or detect a final parking line L from the plurality of selected candidate points Q through a line fitting process. Particularly, the parking line detection unit 120 may extract line components R1, R2, and R3 by performing an investigation in a direction of 360° based on the selected candidate points Q. Further, the parking line detection unit 120 may select or detect a line component, which passes through the plurality of candidate points Q, among the extracted line components R1, R2, and R3 as the final parking line L as illustrated in FIG. 2E.

Referring back to FIG. 1, the distance and inclination calculation unit 130 may calculate a distance between the vehicle and the parking line and an inclination (slope) between the vehicle and the parking line for the parking line detected by the parking line detection unit 120.

Figure 3:
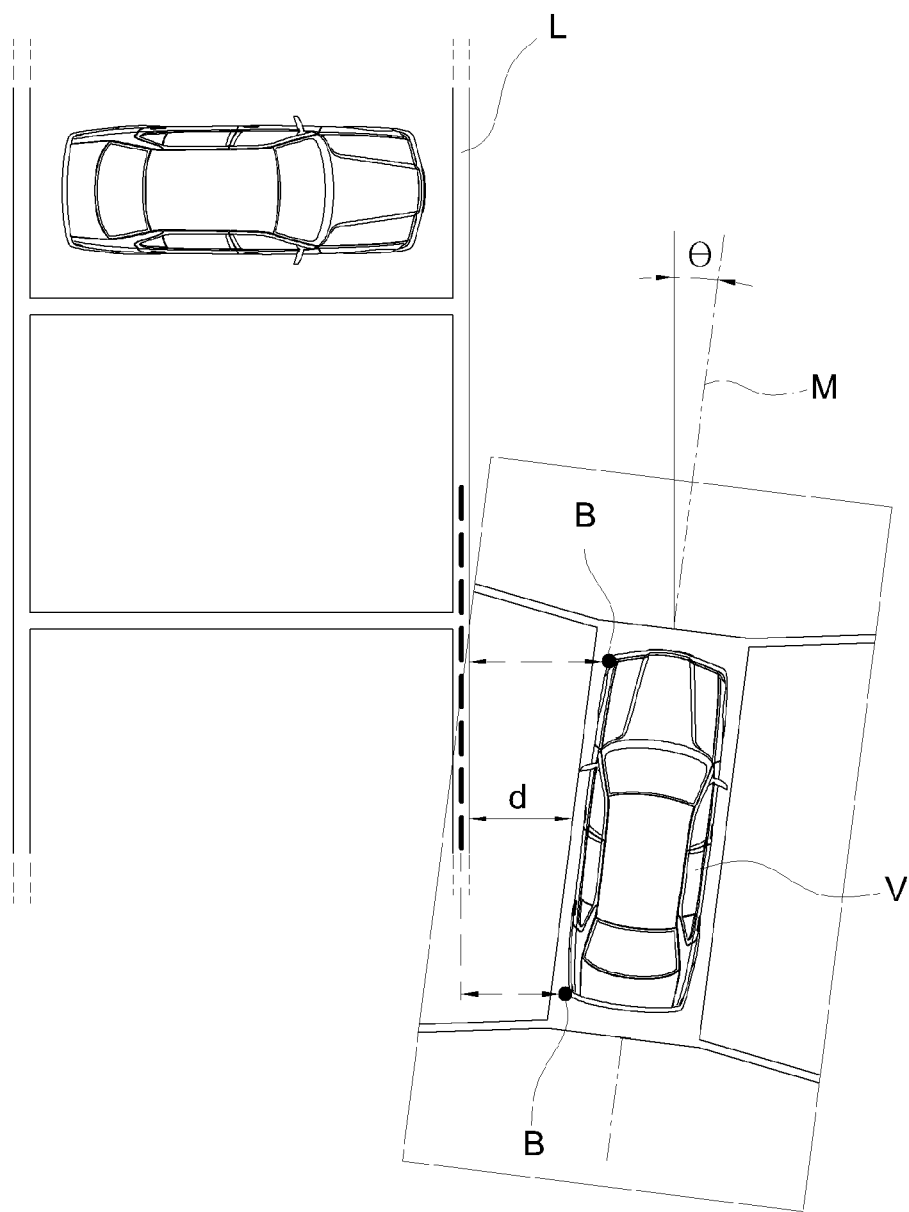
FIG. 3 is a diagram illustrating an example of a method of calculating a distance and an inclination between a parking line and a vehicle by a distance and inclination calculation unit illustrated in FIG. 1.

FIG. 3 is a diagram illustrating an example of a method of calculating a distance and an inclination between a parking line and a vehicle by the distance and inclination calculation unit illustrated in FIG. 1.

Referring to FIG. 3, the distance and inclination calculation unit 130 may calculate a distance d between the detected parking line L and a vehicle V. For example, the distance and inclination calculation unit 130 may calculate the distance d between the parking line L and the vehicle V in an image coordinate system based on the composed image and the detected parking line L, and calculate the distance d between the parking line L and the vehicle V by a method of converting the distance d in the image coordinate system into a distance in a world coordinate system.

The distance and inclination calculation unit 130 may calculate the distances d between the vehicle V and the parking line L at a plurality of points as necessary. In this case, each point for calculating the distance d may be set considering a mounting position of an ultrasonic wave sensor B of the vehicle V. For example, when the ultrasonic wave sensors B are mounted at front and rear sides of the vehicle, respectively, as illustrated in FIG. 3, the distance and inclination calculation unit 130 may calculate the distance d between the vehicle V and the parking line L at the point at which each of the ultrasonic wave sensors B is mounted. Otherwise, although not illustrated, each point for calculating the distance d may be set considering a position of mounting a camera to the vehicle V. This is for the purpose of disposing the vehicle V at an initial position, at which each ultrasonic wave sensor B or the camera may appropriately recognize the parking space and the like, during the parking assistance or guide through the ultrasonic wave sensor B or the camera.

In the meantime, the distance and inclination calculation unit 130 may calculate an inclination θ between the detected parking line L and the vehicle V. The inclination θ may be calculated by an angle between a longitudinal center axis M of the vehicle V and the detected parking line L.

Referring back to FIG. 1, the movement path generation unit 140 may generate a movement path for disposing the vehicle at the appropriate initial position based on the parking line detected through the parking line detection unit 120, and the distance and the inclination calculated by the distance and inclination calculation unit 130.

In this case, the movement path generation unit 140 may generate the movement path of the vehicle under a condition that the distance between the vehicle and the parking line approaches a predetermined distance, and the inclination between the vehicle and the parking line is 0° (or the vehicle is parallel to the parking line). Further, a position, at which the appropriate parking space may be recognized considering the effective detection range or the detection accuracy of the camera, the ultrasonic wave sensor, and the like, may be set as the initial position.

Figure 4:
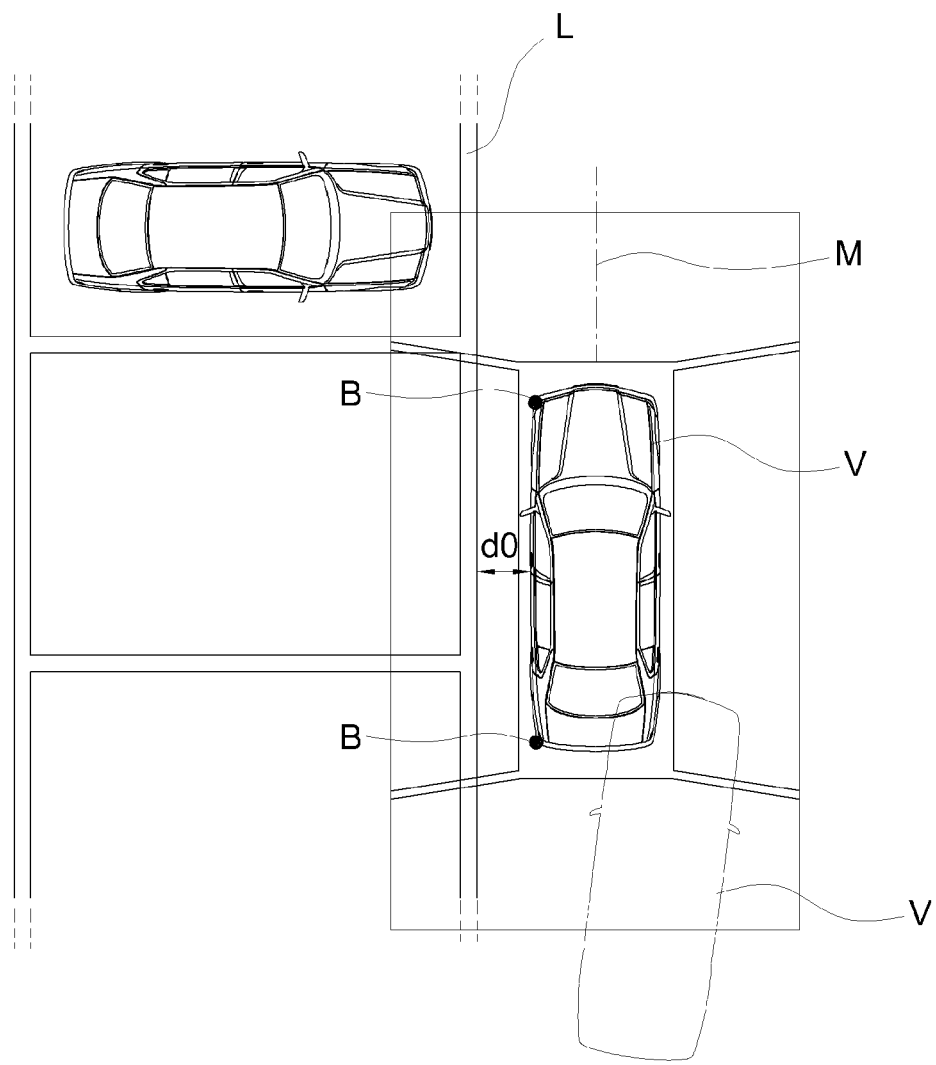
FIG. 4 is a diagram illustrating an example of a method of generating a movement path by a movement path generating unit illustrated in FIG. 1.

FIG. 4 is a diagram illustrating an example of a method of generating a movement path by the movement path generating unit illustrated in FIG. 1.

Referring to FIG. 4, the movement path generation unit 140 may generate a movement path of the vehicle V so that the distance d between the vehicle V and the parking line L approaches a predetermined distance d0. In this case, the predetermined distance d0 may be set considering the effective detection range or the detection accuracy of the ultrasonic wave sensor B or the camera (not illustrated) mounted in the vehicle V.

The movement path generation unit 140 may generate the movement path of the vehicle V so that the inclination θ between the longitudinal center axis M of the vehicle V and the parking line L is 0°. That is, the movement path generation unit 140 may generate the movement path of the vehicle V so that the vehicle V and the parking line L are disposed in a parallel.

As a result, the movement path generation unit 140 may generate the movement path for disposing the vehicle V at the initial position. A position, at which the ultrasonic wave sensor B or the camera mounted in the vehicle V may detect the parking space and the like within the effective detection range or with the detection accuracy of a reference level or higher may be set as the initial position.

In the meantime, the movement path is generated based on a forward movement of the vehicle V in FIG. 4, but is not essentially limited thereto, and the movement path generation unit 140 may also generate the movement path based on a reverse movement of the vehicle V as necessary.

Referring back to FIG. 1, the movement assistance unit 150 assists the movement of the vehicle according along the movement path generated by the movement path generation unit 140. That is, the movement assistance unit 150 may control driving of the steering wheel so that the vehicle may be disposed at the aforementioned initial position according along the generated movement path. Otherwise, the movement assistance unit 150 may guide the movement path of the vehicle to the user through an audio-visual means, such as a voice and a guide message, as necessary, and assist the operation of the steering wheel so that the vehicle may be disposed at the appropriate initial position.

In the meantime, the vehicle may be moved to the aforementioned initial position by the movement assistance unit 150, and after the vehicle is moved to the initial position, the parking space may be recognized and the parking may be guided through the ultrasonic wave sensor or the camera. The aforementioned process may be performed by the parking assistance system based on the ultrasonic wave sensor or the parking assistance system based on an image, which are publicly known in the related art. However, the parking assisting system 100 according to the present exemplary embodiment may guide the vehicle to the appropriate initial position from an initial state before recognizing the parking space, to more reliably recognize the parking space and guide the parking, which thus may be distinguished from the parking assisting system publicly known in the related art.

To additionally describe the system, the general parking assistance system in the related art, the recognition of the parking space and the guide for the parking begins in a state where the user directly drives the vehicle to the vicinity of the parking line or directly disposes the vehicle at the vicinity of the parking line. In this case, the initial position of the vehicle, at which the recognition of the parking space, and the like begins, totally depends on the operation of the user. Accordingly, the system operation may be initiated in a state where the parking line and the vehicle are spaced apart from each other by a predetermined interval or more, or the vehicle is misaligned to the parking line, and this may cause deviation from the effective detection range of the ultrasonic wave sensor or the camera or deterioration in the detection accuracy. Particularly, a user, which is not accustomed to use the system, may have difficulty in disposing the vehicle at an appropriate interval or in a posture for operating the system, and this causes inconvenience in use.

In the meantime, the parking assistance system 100 according to the present exemplary embodiment may guide and dispose the vehicle at the appropriate initial position when the vehicle is moved to the vicinity of the parking line, thereby more smoothly recognizing the parking space or guiding the parking, and promoting convenience of the user.

Figure 5:
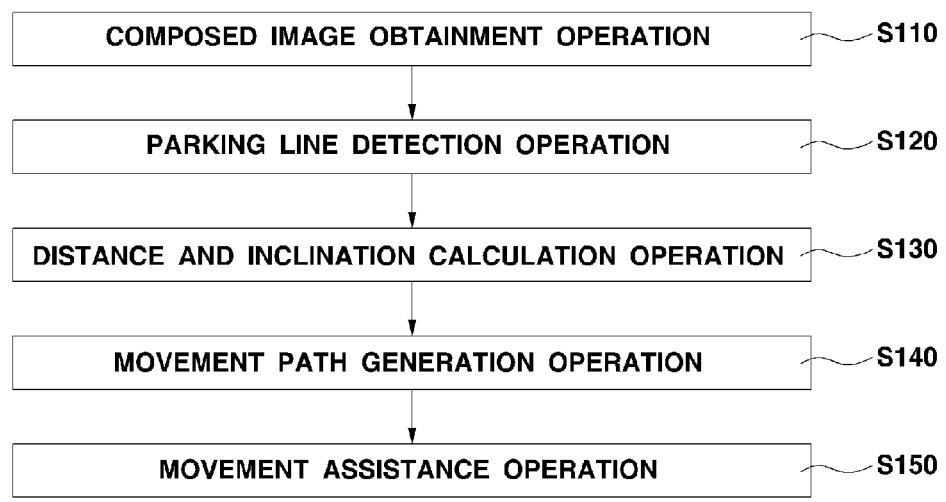
FIG. 5 is a flowchart illustrating a parking assistance method for a vehicle according to an exemplary embodiment of the present invention.

FIG. 5 is a flowchart illustrating a parking assistance method for a vehicle according to an exemplary embodiment of the present invention.

The parking assistance method for a vehicle according to the present exemplary embodiment (hereinafter, referred to as the "parking assistance method") may be implemented by the parking assistance system 100 according to the aforementioned exemplary embodiment.

Referring to FIG. 5, the parking assistance method for a vehicle according to the present exemplary embodiment (hereinafter, referred to as the "parking assistance method") may include a composed image obtainment operation S110, a parking line detection operation S120, a distance and inclination calculation operation S130, a movement path generation operation S140, and a movement assistance operation S150.

In the composed image obtainment operation S110, a composed image in a form of a top view or an around view may be generated by composing front, rear, left, and right images of the vehicle obtained from the camera. The composed image obtainment operation S110 may be implemented by the aforementioned image composition unit 110.

In the parking line detection operation S120, a parking line may be detected based on the generated composed image. The detection of the parking line may be implemented by extracting candidate points having a brightness pattern of the parking line from the composed image, and performing a line fitting process. The detection of the parking line may be implemented by the aforementioned parking line detection unit 120, and the detailed process of detecting the parking line may be performed similarly to the process aforementioned with reference to FIG. 2.

In the meantime, in the distance and inclination calculation operation S130, a distance and an inclination between the vehicle and the parking line may be calculated for the detected parking line. The distance and the inclination may be calculated through a process of calculating a distance and an inclination in an image coordinate system and then converting the calculated distance and inclination in the image coordinate system to a distance and an inclination in a world coordinate system. The calculation of the distance and the inclination may be implemented by the distance and inclination calculation unit 130 aforementioned with reference to FIG. 3.

In the movement path generation operation S140, a movement path for disposing the vehicle to an initial position may be generated. In this case, the initial position may be set considering an effective detection range or detection accuracy of the ultrasonic wave sensor or the camera mounted in the vehicle. Further, the movement path may be set under the condition that a longitudinal center axis of the vehicle is disposed to be parallel to the parking line, and a distance between the vehicle and the parking line approach a predetermined distance. The movement path generation operation S140 may be implemented by the movement path generation unit 140 aforementioned with reference to FIG. 4.

In the movement assistance operation 150, a process of disposing the vehicle to the initial position according along the generated movement path may be performed. The movement assistance operation S150 may be performed by a method of automatically controlling the steering wheel along the generated movement path, or a method of guiding a user operation of the steering wheel by an audio-visual method, and may be implemented by the aforementioned movement assistance unit 150.

As described above, according to the parking assistance system and method according to the exemplary embodiments of the present invention, the vehicle may be moved to and disposed at a predetermined initial position considering an effective detection range or detection accuracy of the ultrasonic wave sensor and the like. Accordingly, it is possible to more accurately and reliably recognize a parking space. Further, the parking assistance system and method according to the exemplary embodiments of the present invention may automatically control a movement of the vehicle or guide the movement of the vehicle to a user from an initial stage before recognizing the parking space, thereby enabling the user to more easily and conveniently receive parking assistance or guide.

As described above, exemplary embodiments of the present invention have been described, but it will be appreciated by those skilled in the art that the present invention may be modified and changed in various ways without departing from the spirit of the present invention described in the claims by the addition, change, or deletion of constituent elements, and that the modifications and changes are included in the claims of the present invention.

What is claimed is:

1. A system for assisting parking for a vehicle, comprising:
an image composition unit configured to generate a composed image in a form of a top view or an around view;
a parking line detection unit configured to detect a parking line through image-processing of the composed image;
a distance and inclination calculation unit configured to calculate a distance and an inclination (slope) between the detected parking line and the vehicle; and
a movement path generation unit configured to generate a movement path for deposing the vehicle at an initial position, the initial position being set to a position at which the detected parking line is parallel to a longitudinal center axis of the vehicle, and the detected parking line and the vehicle are spaced apart from each other by a predetermined interval.

2. The system of claim 1, further comprising:
a movement assistance unit configured to control driving of a steering wheel of the vehicle according along the generated movement path, or guide a user operation of the steering wheel through an audio-visual means.

3. The system of claim 1, wherein the parking line detection unit sets a plurality of sections in the composed image, and extracts a plurality of characteristic points by investigating the composed image in a horizontal direction for each section.

4. The system of claim 3, wherein a point having a light and shade gradient with a predetermined value or larger is extracted from a contour line image of the composed image as each of the characteristic points.

5. The system of claim 3, wherein the parking line detection unit selects a plurality of candidate points having a brightness pattern of the parking line among the plurality of characteristic points.

6. The system of claim 5, wherein the brightness pattern of the parking line is repeated in an order of dark, bright, and dark based on each of the candidate points during the investigation of the composed image in the horizontal direction for each section.

7. The system of claim 3, wherein the parking line detection unit detects the parking line by line fitting the plurality of candidate points, and
the line fitting extracts a plurality of line components by performing investigation in a direction of 360° based on each of the candidate points, and then detects a line component passing through the plurality of candidate points among the plurality of line components as the parking line.

8. The system of claim 1, wherein the distance and inclination calculation unit calculates distances between the detected parking line and the vehicle at a plurality of points, and
a position of an ultrasonic wave sensor or a camera mounted in the vehicle is set as each of the points.

9. The system of claim 1, wherein the initial position is set considering an effective detection range or detection accuracy of an ultrasonic wave sensor or a camera mounted in the vehicle.

10. A method of assisting parking for a vehicle, comprising:
a composed image obtainment operation of generating a composed image in a form of a top view or an around view from an image photographed by a plurality of cameras;
a parking line detection operation of detecting a parking line based on the composed image;
a distance and inclination calculation operation of calculating a distance and an inclination (slope) between the detected parking line and the vehicle;
a movement path generation operation of generating a movement path for disposing the vehicle at an initial position, the initial position being set considering an effective detection range or detection accuracy of an ultrasonic wave sensor or a camera mounted in the vehicle; and
a movement assistance operation of controlling driving of a steering wheel of the vehicle according along the generated movement path, or guiding a user operation of the steering wheel through an audio-visual means.

11. The method of claim 10, wherein the parking line detection operation includes:
an operation of setting a plurality of sections in the composed image; and an operation of extracting a plurality of characteristic points, each of which has a light and shade gradient with a predetermined value or larger, by investigating the composed image in a horizontal direction for each section.

12. The method of claim 11, wherein the parking line detection operation includes an operation of selecting a plurality of candidate points having a brightness pattern of the parking line among the plurality of characteristic points, and the brightness pattern of the parking line is repeated in an order of dark, bright, and dark based on each of the candidate points during the investigation of the composed image in the horizontal direction for each section.

13. The method of claim 12, wherein the parking line detection operation includes:

an operation of extracting a plurality of line components by performing investigation in a direction of 360° based on each of the candidate points; and an operation of detecting a line component passing through the plurality of candidate points among the plurality of line components as the parking line.

14. The method of claim 10, wherein the movement path is generated under a condition that the detected parking line is parallel to a longitudinal center axis of the vehicle, and the detected parking line and the vehicle are spaced apart from each other by a predetermined interval.

15. The method of claim 10, wherein in the distance and inclination calculation operation, distances between the detected parking line and the vehicle at a plurality of points are calculated, and a position of an ultrasonic wave sensor or a camera mounted in the vehicle is set as each of the points.

* * * * *